US008634492B2

(12) United States Patent
Razzell (10) Patent No.: US 8,634,492 B2
(45) Date of Patent: Jan. 21, 2014

(54) TRANSMITTER AND RECEIVER FOR ULTRA-WIDELAND OFDM SIGNALS EMPLOYING A LOW-COMPLEXITY CDMA LAYER FOR BANDWIDTH EXPANSION

(75) Inventor: Charles Razzell, Pleasanton, CA (US)

(73) Assignee: NXP, B.V., Eindhoven (NL)

( * ) Notice: Subject to any disclaimer, the term of this patent is extended or adjusted under 35 U.S.C. 154(b) by 1259 days.

(21) Appl. No.: 11/597,587

(22) PCT Filed: May 20, 2005

(86) PCT No.: PCT/IB2005/051658
§ 371 (c)(1),
(2), (4) Date: Jan. 18, 2008

(87) PCT Pub. No.: WO2005/114858
PCT Pub. Date: Dec. 1, 2005

(65) Prior Publication Data
US 2008/0212693 A1 Sep. 4, 2008

Related U.S. Application Data

(60) Provisional application No. 60/573,045, filed on May 21, 2004, provisional application No. 60/612,753, filed on Sep. 24, 2004.

(51) Int. Cl.
*H04L 27/00* (2006.01)
*H04B 1/00* (2006.01)
(52) U.S. Cl.
USPC ............ 375/295; 375/316; 375/146; 375/362

(58) Field of Classification Search
USPC ............ 375/145, 149, 240.28, 324, 340, 362, 375/363, 365, 367, 366, 130, 147, 146, 135, 375/133, 219, 220, 240.11, 240.1, 240.02, 375/295, 302, 364
See application file for complete search history.

(56) References Cited

U.S. PATENT DOCUMENTS

| 5,732,113 | A | * | 3/1998 | Schmidl et al. | ............... 375/355 |
| 6,950,624 | B2 | * | 9/2005 | Kim et al. | ..................... 455/3.01 |
| 7,746,760 | B2 | * | 6/2010 | Vijayan et al. | ................ 370/206 |
| 2001/0031639 | A1 | * | 10/2001 | Makipaa | ....................... 455/450 |

(Continued)

FOREIGN PATENT DOCUMENTS

WO 02/073831 A1 9/2002
WO WO 2005/034419 4/2005

OTHER PUBLICATIONS

Vandendorpe L: "Multitone Spread Spectrum Multiple Access Communications Systems in a Multipath Rician Fading Channel"; IEEE Transactions on Vehicular Technology; IEEE New York; US; vol. 44 No. 2, May 1995; pp. 327-337.

(Continued)

*Primary Examiner* — Sam K Ahn
*Assistant Examiner* — Linda Wong (57) ABSTRACT

A method and apparatus for transmitting and receiving high-bandwidth OFDM signals, while limiting the complexity of the OFDM signal processing is described. Bandwidth expansion is achieved by repetition of whole OFDM symbols with the polarity of repetitions determined by a long PN code. This technique ensures a perfectly white spectrum. Use of zero-suffix OFDM symbols allows a large tolerance to multipath channels, even while maintaining a single, low-rate RAKE finger for despreading in the receiver.

21 Claims, 8 Drawing Sheets

(56) References Cited

U.S. PATENT DOCUMENTS

| | | | |
|---|---|---|---|
| 2002/0191569 A1* | 12/2002 | Sung et al. | 370/335 |
| 2003/0032389 A1* | 2/2003 | Kim et al. | 455/3.01 |
| 2003/0043733 A1 | 3/2003 | Maeda et al. | |
| 2004/0114551 A1* | 6/2004 | Gavillero Martin et al. | 370/324 |
| 2004/0141481 A1* | 7/2004 | Lee et al. | 370/335 |
| 2005/0078598 A1 | 4/2005 | Batra et al. | |
| 2005/0174931 A1* | 8/2005 | Krishnamoorthi | 370/208 |
| 2006/0239334 A1* | 10/2006 | Kwon et al. | 375/132 |
| 2007/0253496 A1* | 11/2007 | Giannakis et al. | 375/260 |
| 2008/0112382 A1* | 5/2008 | Shim et al. | 370/342 |

OTHER PUBLICATIONS

Muquet B et al: "Cyclic Prefixing or Zero Padding for Wireless Multicarrier Transmissions?" IEEE Transactions on Communications, IEEE Inc. New York US; vol. 50 No. 12; Dec. 2002 pp. 2136-2148.

Saberinia, E. et al. "Outage Capacity of Pulsed-OFDM Ultra Wideband Communications", IEEE Joint with Conference on Ultrawideband Systems and Technologies, pp. 323-327 (2004).

* cited by examiner

FIG. 8 ured envelope waveform.
TRANSMITTER AND RECEIVER FOR ULTRA-WIDELAND OFDM SIGNALS EMPLOYING A LOW-COMPLEXITY CDMA LAYER FOR BANDWIDTH EXPANSION

CROSS REFERENCE TO RELATED APPLICATION

This application claims the benefit of U.S. provisional application Ser. Nos. 60/573,045 filed May 21, 2004, and 60/612,753 filed Sep. 24, 2004 which is incorporated herein whole by reference.

It is already known and proposed to use OFDM for ultra-wideband transmission for high rate wireless Personal Area Networks (PANs). These systems are proposed to operate at below the limit for accidental emissions from electronic equipment in existence today, but will nevertheless provide data rates of up to 480 MBps in a 3 m range and 110 Mbps over a 10 m range. With reasonable complexity, such systems can be made to occupy a fundamental bandwidth of 528 MHz, while an additional layer of frequency hopping is applied to multiply the occupied bandwidth by an integer factor (typically three).

It is also known and proposed to use a pure direct sequence spread spectrum system, employing a chip rate of around 1.4 billion chips per second and an associated RAKE receiver or channel matched filter which must perform multiply and accumulate operations at the aforementioned chip rate. In addition, equalizers such as decision feedback equalizers are likely to be needed to obtain a low error floor.

Although the combination of OFDM and frequency hopping works well in principal, regulatory agencies are as yet undecided regarding the interference properties and allowed power levels for such systems. Since the mean power allowed is set according to the average power spectral density of the signal, the hopping effectively increases the peak power by a factor of N, where N is the number of hops, which may increase the interference impact on certain wide-band receivers by the same factor. This is of particular concern to wideband satellite receiver systems such as C-band satellite dishes. Given this potential constraint, methods are being sought that allow bandwidth expansion of OFDM signals, but do not rely on frequency hopping.

An alternative scheme based on direct sequence spread spectrum is already proposed, but the signal processing complexity of that solution may not be acceptable, given that correlators must run in excess of 1 billion samples per second, and that multiple correlators are needed to form an acceptable RAKE receiver, assuming digital signal processing employed. Digital signal processing is highly desirable due to the Moore's law reduction in complexity of digital circuits with IC process geometry reductions.

The proposed signal waveform is OFDM symbols that have been upsampled by repetition. The repetition is done in the time-domain in units of whole OFDM signals. In order to avoid spectrum ripple caused by any repetition, two measures are employed:

1. A zero energy suffix is used in place of cyclic prefix typically found in OFDM symbols
2. The repeated OFDM symbols are subject to polarity inversion according to a long PN sequence, which is known at the transmitter and receiver.

Since the channel is essentially time invariant over the length of the repetition, the receiver may recover the original OFDM symbols by simple addition or subtraction according to the known PN sequence. Finally, an overlap and add operation is performed on each despread OFDM symbol, to force the desired cyclic-invariant property of the samples applied to the fast Fourier transform (FFT).

After passing through the FFT, frequency domain samples can be equalized by either dividing each frequency bin by the complex conjugate of the corresponding bin of the frequency-domain channel estimate. Equivalently, complex conjugate multiplication of the same quantities can be used to derotate the phase shifts caused by the channel in cases where amplitude accuracy is not needed for demodulation such as M-ary PSK.

A new understanding is that upsampling of OFDM signals by repetition does not alter the required IFFT and FFT throughput, but does increase the occupied bandwidth. Filtering performed in the frequency domain in the transmitter is preserved in shape by this new upsampling process, making it suitable for low out of band emissions, and flexible spectrum radios in general.

Figure 1:
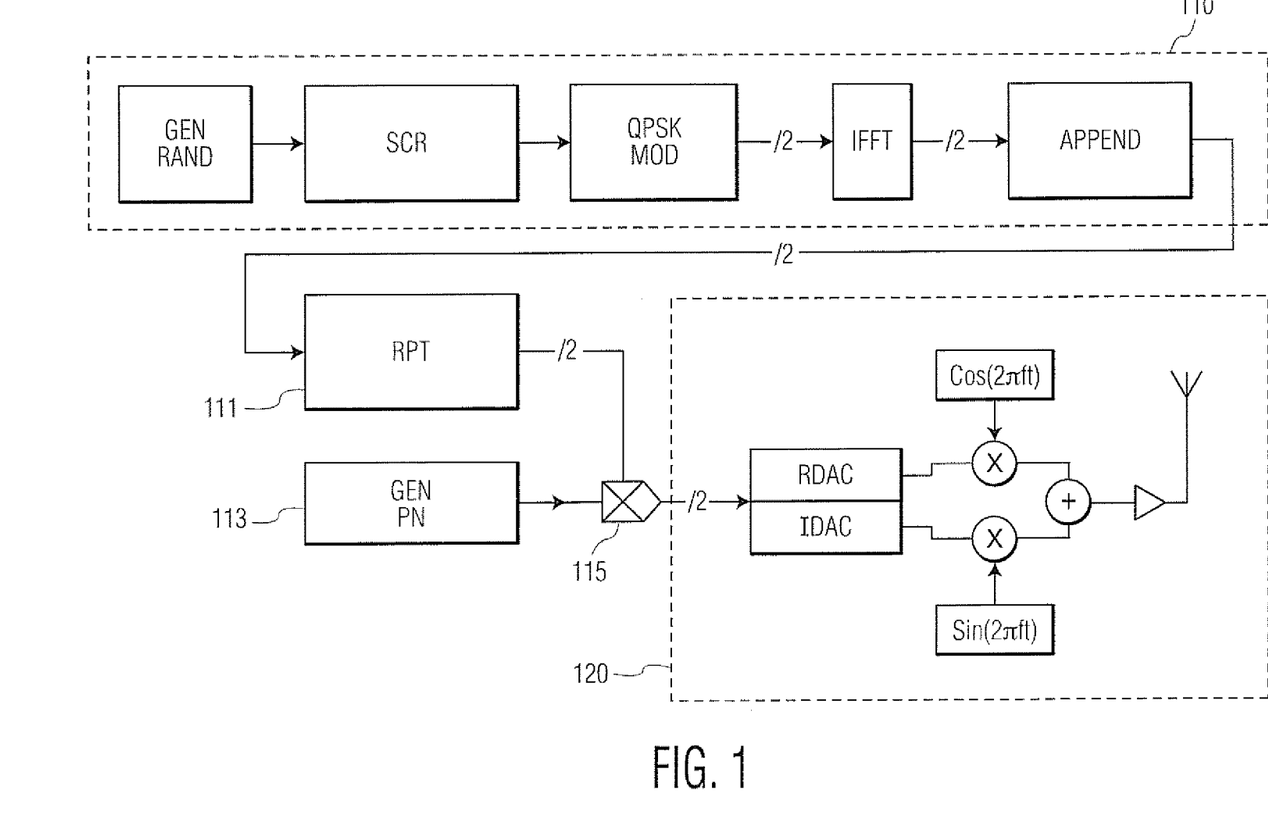
FIG. 1 is a block diagram of a transmitter according to the principles described herein.

The transmitter block diagram of FIG. 1 shows one possible embodiment of the transmitter section. QPSK modulation is chosen by way of example. Within FIG. 1, the notation "/2" is used to represent a complex signal.

The first five blocks, indicated generally by reference numeral 110, are known in the art: they include a random source of information bits, forward error correction encoding followed by a QPSK modulator. The frequency bins of the IFFT are filled with QPSK symbols. (Optionally zeros may be inserted at d.c. and elsewhere where zero energy is desired in the frequency domain. In addition, pilot tones may be inserted at this point.) A zero energy suffix is appended of a length designed to be equal to or greater than the longest significant channel impulse response.

One of the challenges of UWB systems is to occupy a very large bandwidth within the bounds of acceptable hardware complexity. Unless a very large bandwidth is occupied, then because of the mandated extremely low signal power of the transmitted signal, the received signal becomes unusable. This challenge is addressed in the transmitter of FIG. 1 using bandwidth expansion. In the embodiment of FIG. 1, bandwidth expansion takes place in the block 111 labelled "Upsample by repetition of whole OFDM symbols." The number of times to repeat each OFDM symbol (including its associated cyclic suffix) is implementation dependent. In one embodiment a factor of four may be used, resulting in bandwidth expansion by the same factor.

Each copy of the OFDM symbol is either inverted or not according to the current value of a PN sequence generated by a bipolar (+1, −1) PN generator 113. The index of the PN sequence is incremented by one for each OFDM symbol transmitted. In other words, the PN sequence rate is the same as the OFDM symbol rate. In practice, rather than use a multiplier 115 as shown in FIG. 1, the sign of each buffered OFDM sample may be inverted or nor within the buffer according to the current polarity of the PN generator. Without the PN generator, OFDM symbol repetition would produce excessive "spectral ripple," i.e., allowing unmodified repetitions in the time-domain would cause the autocorrelation of the waveform to deviate from the ideal Dirac impulse, implying that power that in the frequency domain, the power spectral density is non-white.

The number of samples representing the original information bits is increased by a factor N corresponding to the number of repetitions of each whole OFDM symbol that are applied in block 111 of FIG. 1. It is assumed that the sampling rates with which the repeated OFDM symbols are converted to the analogue domain is increased by the corresponding factor N resulting in bandwidth expansion (by the same factor N) with respect to the situation where no spreading is applied.

The use of a variable spreading factor N in block 111 with a corresponding increase in the rate of the PN generator 113 is intended to provide a low-complexity bandwidth expansion scheme with a possibly variable factor N. By varying the factor N, the user data rate can be traded against spreading gain, providing advantageous scalability and flexibility of end user data rates, while maintaining the same occupied bandwidth. This flexibility is similar to that provided by Orthogonal Variable Spreading Factor (OVSF) codes used in 3G cellular telephones.

The PN sequence need only be long enough to ensure that repetitions are avoided over the largest supported value of upsampling ratio N. For simplicity, the phase of the PN sequence may be synchronized to the end of the preamble at the start of a burst of OFDM symbols. If desired, different PN sequences can be used for different piconets operating in the same spectrum allocation to minimize the probability of cross-communication between piconets. However, it is not required that the used PN sequence change over time for a given piconet or peer-to-peer communication session.

The final steps in the transmitter are digital to analogue conversion and frequency shifting of the baseband signal to a suitable RF carrier frequency. These steps, indicated generally by reference numeral 120, follow a conventional scheme and do not require further elaboration here.

Figure 2:
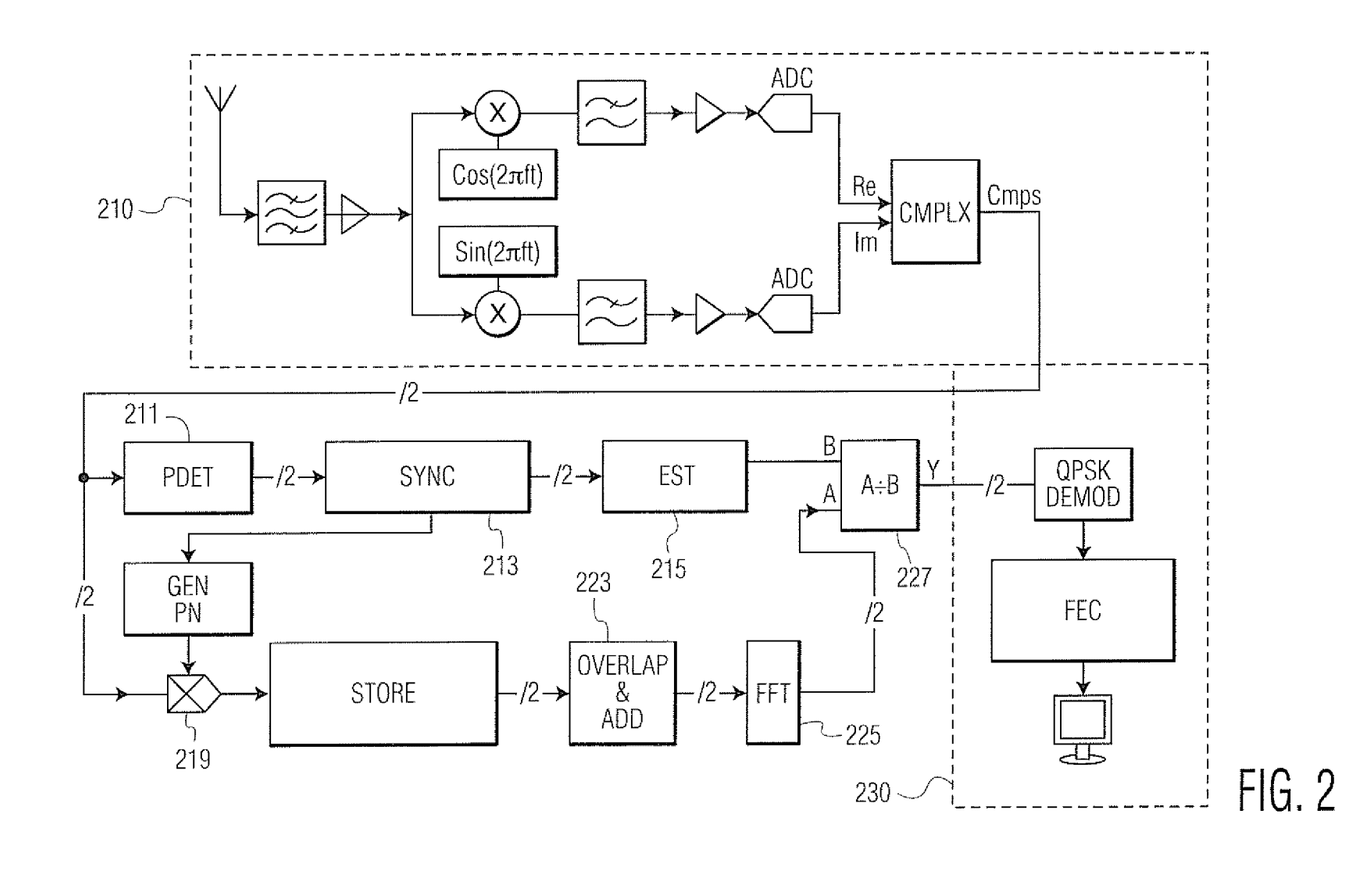
FIG. 2 is a block diagram of a receiver according to the principles described herein.

The block diagram of FIG. 2 shows a receiver architecture designed to receive the bandwidth expanded OFDM signal in the presence of multi-path delay spread in the radio frequency channel.

In the upper half of FIG. 2, a conventional direct down-conversion receiver followed by a pair of Analogue to Digital converters and a complex sample former are together indicated generally by reference numeral 210. The remainder of the lower half of the diagram shows an example of the contemplated numeric signal processing. By way of example, channel estimation and synchronization are derived from an initial pre-amble (assumed but not shown in the transmitter). The complex samples are therefore first applied to a preamble detection block 211, followed in succession by a synchronization block 213 and a channel estimation block 215. The phase and timing of a local PN sequence generator 217 are obtained from this initial synchronization with the preamble. Polarity inversion, which reverses that done in the transmitter, is represented by a digital multiplier 219 inserted directly before the block 221 labelled "Store and additively combine N OFDM symbols."

Bandwidth/rate reduction in the receiver is performed by the aforementioned "Store and additively combine N OFDM symbols" block 221. This operation is a simple additive operation and is therefore relatively low complexity.

An "overlap and add" block 223 is responsible for creating the required cyclic properties for a subsequent FFT operation 225. The idea is to make the received symbol block appear as if it has undergone "circular convolution" with the channel impulse response. This is because division of the frequency domain samples is equivalent to the corresponding inverse circular deconvolution process.

Figure 3:
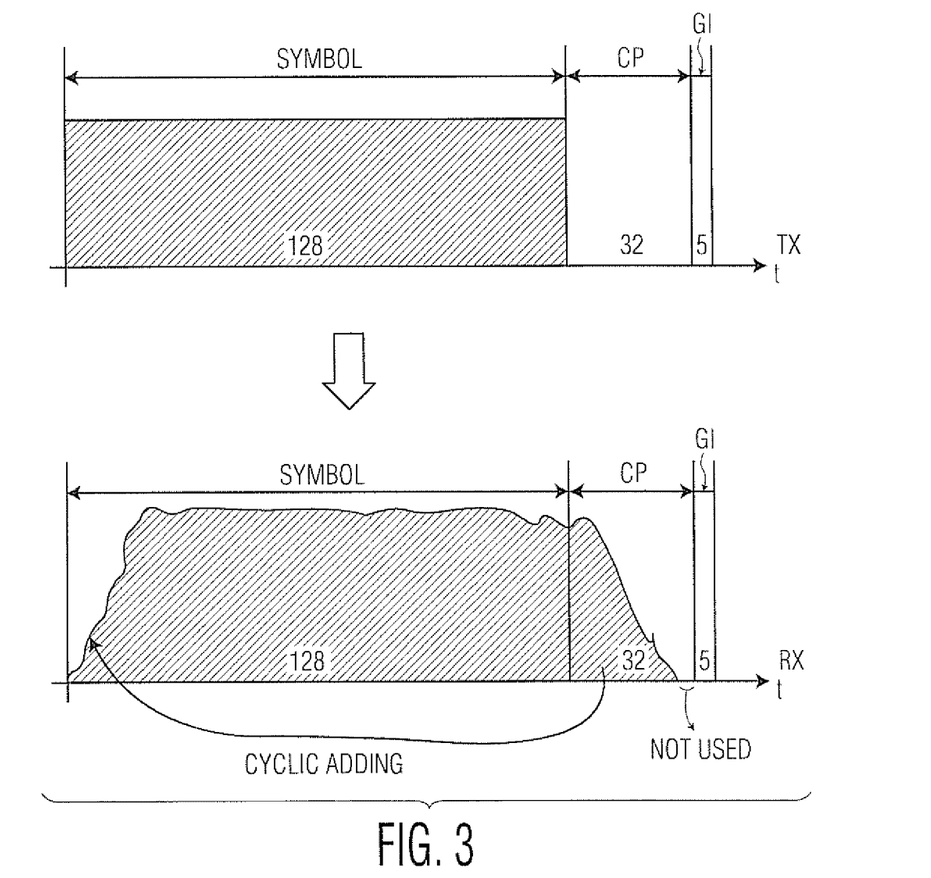
FIG. 3 is a diagram illustrating overlap-and-add processing.
Figure 4:
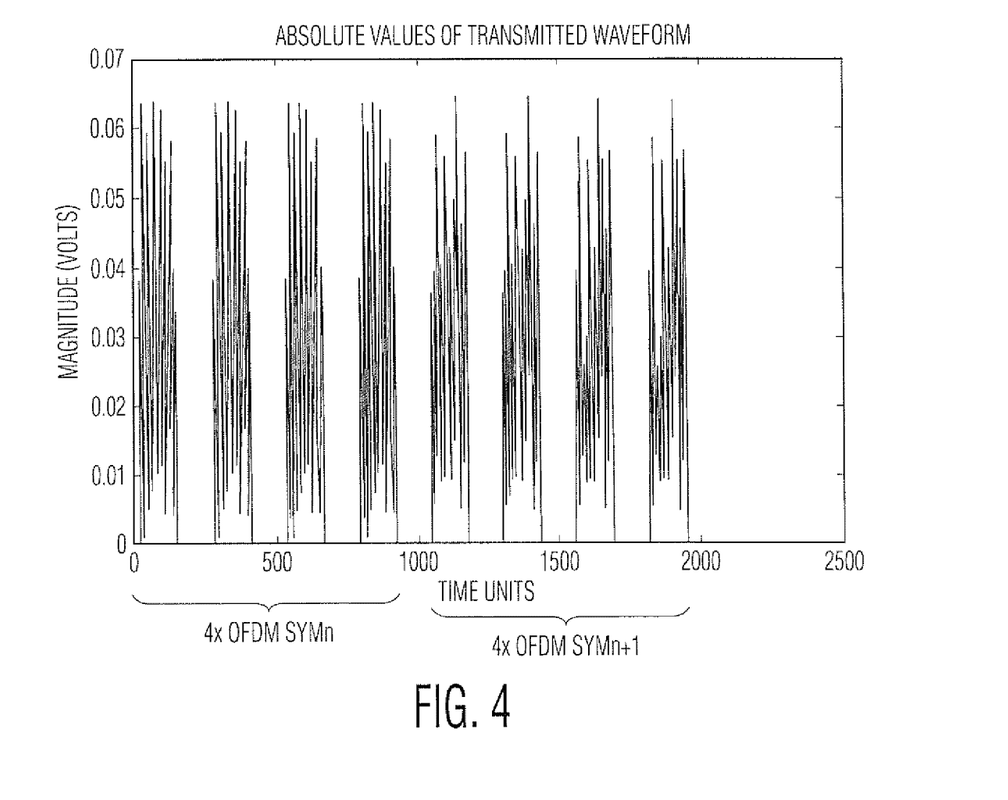
FIG. 4 is a signal diagram illustrating an exemplary transmitted envelope waveform.
Figure 5:
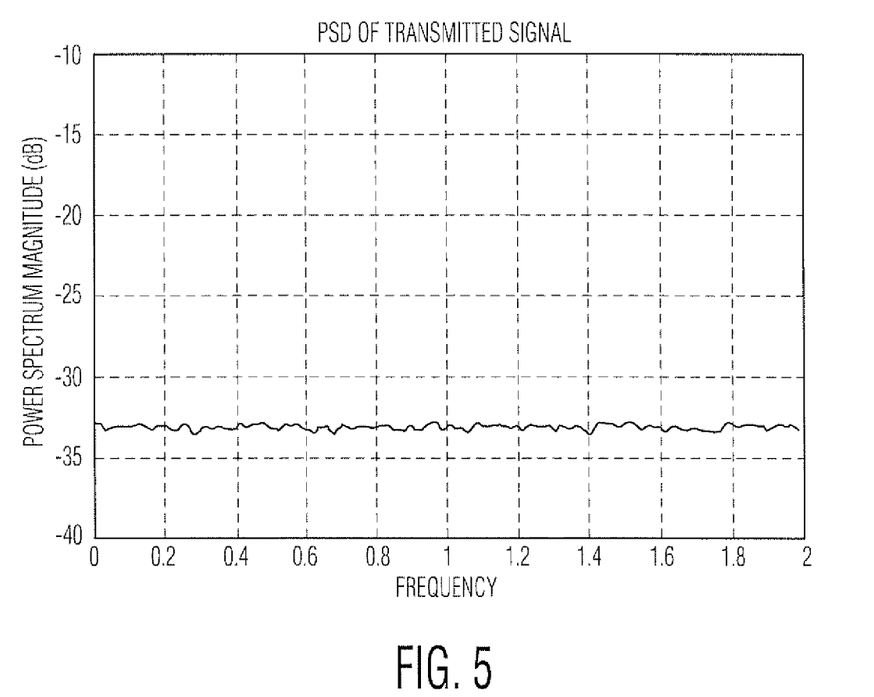
FIG. 5 is a signal diagram illustrating power spectral density (PSD) of the transmitted envelope waveform.
Figure 6:
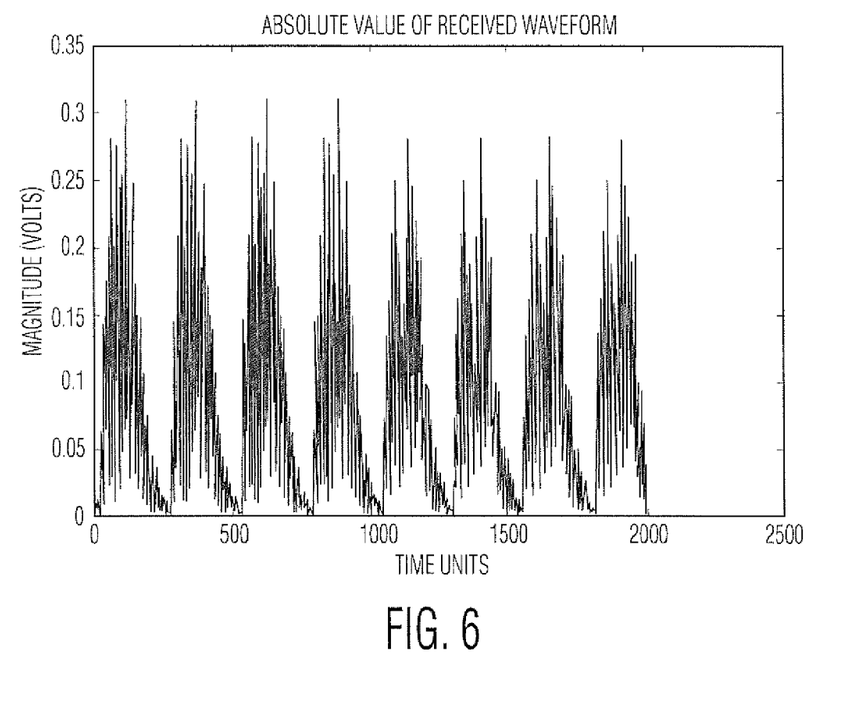
FIG. 6 is a signal diagram illustrating an exemplary received envelope waveform.

As illustrated in FIG. 3, the procedure employed is to take the samples that were received after the end of the OFDM symbol and add them to the corresponding number of samples at the beginning of the OFDM symbol. For example, if the OFDM symbol is 128 samples long followed by 32 samples of zero energy suffix, the corresponding 32 samples at the end of the OFDM symbol should be added to the first 32 samples of the received OFDM symbol.

Referring again to FIG. 2, after the FFT (block 225), a division block 227 performs division in the frequency domain of each FFT bin with the corresponding frequency domain channel estimate. As stated earlier this corresponds to circular deconvolution and inverts the effect of the channel impulse response. In some cases, division may be conveniently replaced by complex conjugate multiplication, such as the present example where QPSK modulation is involved. As indicated generally by reference numeral 230, after QPSK demodulation, normal FEC algorithms are applied to recover the useful information bit stream.

Figure 7:
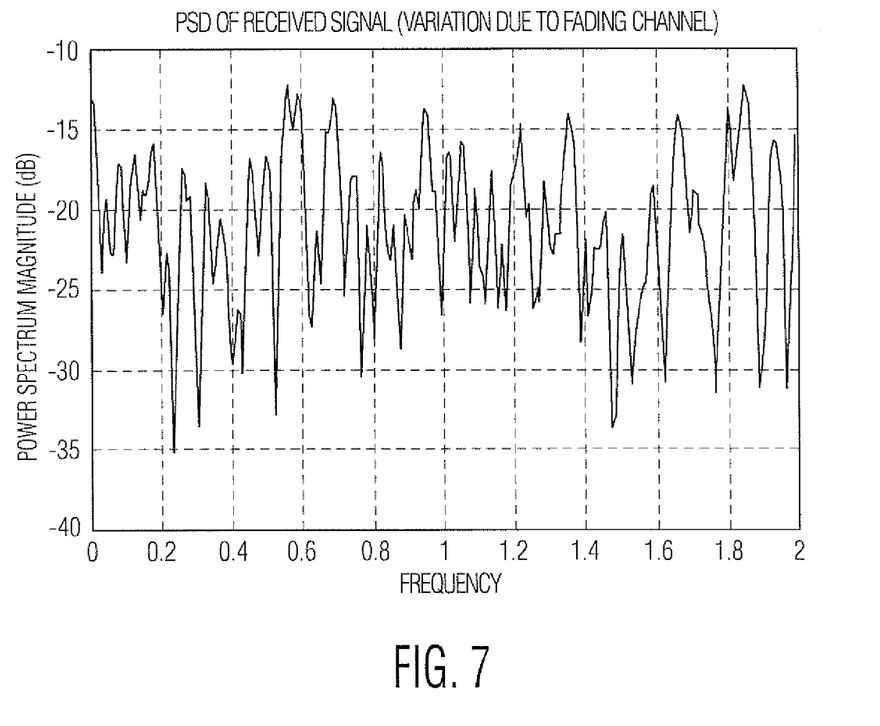
FIG. 7 is a signal diagram illustrating PSD of the exemplary transmitted envelope waveform.
Figure 8:
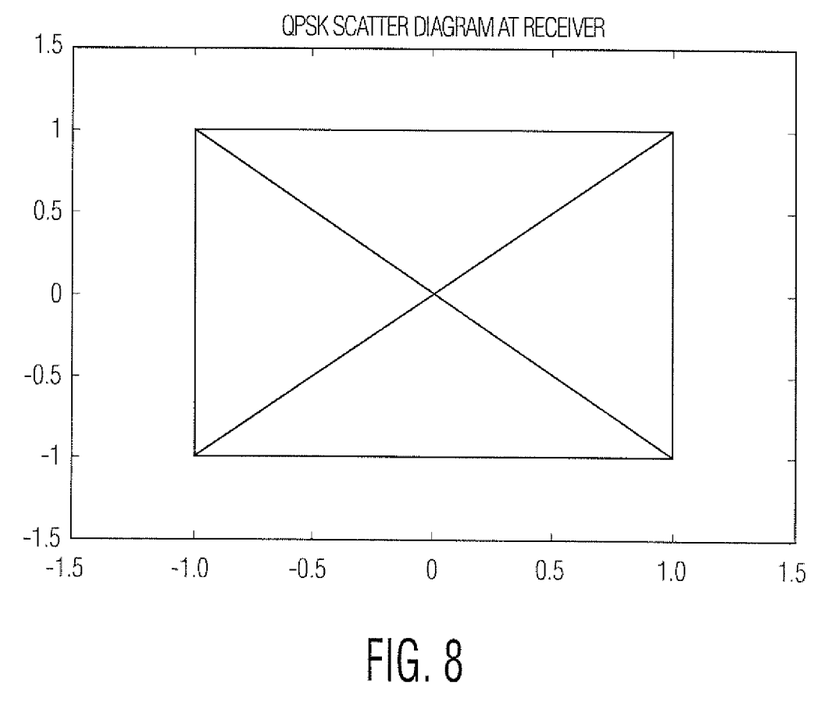
FIG. 8 is a signal diagram illustrating a QPSK scatter diagram at the output of the receiver.

FIGS. 4-8 show illustrative waveforms and power spectra at various points in the communications link. In FIGS. 4-8, each burst is followed by a period of silence corresponding to a zero energy suffix. A group of four bursts and their associated zero energy suffixes may be transmitted in the same time duration as would previously be used for a single OFDM symbol and its associated cyclic prefix or zero energy suffix in the alternative. Note the fading-induced PSD variation at the receiver as shown in FIG. 7, compared to the PSD of the transmitted signal in FIG. 5. Signal processing at the receiver, including the overlap-and-add operation, gives sufficient spreading gain to enable the transmitted information to be recovered with very low probability of error (FIG. 8).

Alternative Embodiments:

1. A transmitter and receiver as specified above, except that a block of tones is set to zero such that the occupied spectrum is less than the sampling rate. This effectively uses the IFFT in the transmitter to obtain upsampling and filtering in one operation.

2. A transmitter and receiver as specified above, except that the size of the OFDM symbol may be dynamically adjusted with a corresponding increase in the number of repetitions of each OFDM symbol. Thus, while keeping the sampling rate constant, the data rate vs. spreading gain may be adjusted as necessary.

3. A transmitter and receiver as specified above, except that the modulation scheme is not fixed at QPSK but can be selected according to the available SNR.

4. A transmitter and receiver as specified above, where the length of the zero energy suffix is allowed to increase to a value equal to but not greater than the length of the energized OFDM symbol.

5. A transmitter and receiver as described above, where the length of the zero energy suffix exceeds that of the energized part of the OFDM symbol in order to a 'sparse' modulation scheme suitable for low data rates. The overlap and add operation in the receiver would be restricted to the length of the energized part of the OFDM symbol.

6. A receiver as specified above, but where the overlap and add operation is only applied to suffix samples that exceed a certain magnitude threshold.

7. A transmitter as specified above, that makes use of power saving techniques during the zero energy part of the transmissions (zero energy suffix). Such power savings may be made in the RF, analogue and mixed signal components, especially the DACs.

8. A receiver as specified above, that uses complex conjugate multiplication instead of complex division to achieve the frequency domain channel equalization.

9. A receiver as specified above where the overlap and add processing is replaced by improved equalization schemes such as MMSE.

Applications

This invention is generally applicable to the problem of spreading and dispreading an OFDM waveform with low signal processing overhead and high resilience to multipath channel effects.

One particular application is in Ultra-wide band systems for high rate, short range communications links. In particular, the current standardization effort in the IEEE (802.15.3a) may select to make use of these techniques as a means to overcome regulatory resistance to frequency hopped signals.

Future standards for cognitive and software defined radios may use a scheme such as this to occupy large swathes of bandwidth selectively according to the prevailing interference conditions. Flexible and irregular spectrum occupation is available by set selected FFT bins to zero energy in the transmitter.

Future international standards for UWB may select a modulation based on this technique in view of the advantages described above.

What is claimed is:

1. A signaling method comprising:
producing an Orthogonal Frequency Division Multiplexing (OFDM) symbol;
appending a suffix of negligible energy to the OFDM symbol;
repeating the OFDM symbol to produce an augmented sequence;
selectively inverting whole OFDM symbols in the augmented sequence according to a polarity of a Pseudo Noise (PN) code to obtain a modified augmented sequence exhibiting improved spectral properties; and
transmitting the modified augmented sequence.

2. The method of claim 1, further comprising:
setting a block of tones in the OFDM symbol to zero to achieve spectrum shaping.

3. The method of claim 1, further comprising:
dynamically varying a size of the OFDM symbol and a repetition factor in inverse relation while maintaining a constant sample rate.

4. The method of claim 1, further comprising:
dynamically varying an applied modulation.

5. The method of claim 1, wherein the suffix of negligible energy is of a length not greater than a length of an energized portion of the OFDM symbol.

6. The method of claim 1, wherein the suffix of negligible energy is of a length greater than a length of an energized portion of the OFDM symbol.

7. The method of claim 1, further comprising:
performing power management steps with respect to selected active components to supply to said active components less power during occurrence of the suffix of negligible energy.

8. A method of signal reception comprising:
receiving a modified augmented sequence in which whole OFDM symbols have been repeated and a resulting augmented sequence has been selectively inverted according to a polarity of a Pseudo Noise (PN) code;
appending a suffix of negligible energy to the whole OFDM symbol;
combining repeated instances of the whole OFDM symbol to obtain a composite OFDM symbol; and
performing a transform operation on the composite OFDM symbol to obtain a transformed sequence.

9. The method of claim 8, further comprising:
performing complex arithmetic division of the transformed sequence.

10. The method of claim 8, further comprising:
performing complex conjugate multiplication of the transformed sequence.

11. The method of claim 9, further comprising:
dividing the transformed sequence by a channel estimate.

12. The method of claim 8, wherein the modified augmented sequence includes periods of silence interspersed between repeated instances of OFDM symbols during which negligible energy was transmitted, and wherein during combining, samples occurring during said periods of silence are combined with samples corresponding to a preceding OFDM symbol.

13. The method of claim 12, wherein said periods of silence exceed a duration of the OFDM symbols, and wherein only samples occurring during a first portion of a period equal to a duration of a preceding OFDM symbol are combined with samples corresponding to the preceding OFDM symbol.

14. A communications transmitter comprising:
means for producing an OFDM symbol;
means for appending a suffix of negligible energy to the OFDM symbol;
means for repeating the whole OFDM symbol to produce an augmented sequence;
means for selectively inverting whole OFDM symbols in the augmented sequence according to a polarity of a Pseudo Noise (PN) code to obtain a modified augmented sequence exhibiting improved spectral properties; and
means for transmitting the modified augmented sequence.

15. A communications receiver comprising:
means for receiving a modified augmented sequence in which a suffix of negligible energy to an OFDM symbol has been repeated, and whole OFDM symbols in resulting augmented sequence have been selectively inverted according to a polarity of a Pseudo Noise (PN) code;
means for combining repeated instances of the whole OFDM symbol to obtain a composite OFDM symbol; and
means for performing a transform operation on the composite OFDM symbol.

16. The apparatus of claim 15, further comprising:
means for performing complex arithmetic division of the transformed sequence.

17. The method of claim 16, wherein the transformed sequence is divided by a channel estimate.

18. A signaling method comprising:
producing an Orthogonal Frequency Division Multiplexing (OFDM) symbol;
repeating the whole OFDM symbol to produce an augmented sequence;
selectively inverting whole OFDM symbols in the augmented sequence according to a polarity of a Pseudo Noise (PN) code to obtain a modified augmented sequence exhibiting improved spectral properties; and
transmitting the modified augmented sequence.

19. A method of signal reception comprising:

receiving a modified augmented sequence in which a whole OFDM symbol has been repeated and whole OFDM symbols in a resulting augmented sequence have been selectively inverted according to a polarity of a Pseudo Noise (PN) code;

combining repeated instances of the whole OFDM symbol to obtain a composite OFDM symbol; and performing a transform operation on the composite OFDM symbol to obtain a transformed sequence.

20. A communications transmitter comprising:

means for producing an OFDM symbol;

means for repeating the whole OFDM symbol to produce an augmented sequence;

means for selectively inverting whole OFDM symbols in the augmented sequence according to a polarity of a Pseudo Noise (PN) code to obtain a modified augmented sequence exhibiting improved spectral properties; and means for transmitting the modified augmented sequence.

21. A communications receiver comprising:

means for receiving a modified augmented sequence in which whole OFDM symbols have been repeated, and whole OFDM symbols in a resulting augmented sequence have been selectively inverted according to a polarity of a Pseudo Noise (PN) code;

means for combining repeated instances of the whole OFDM symbol to obtain a composite OFDM symbol; and means for performing a transform operation on the composite OFDM symbol.

\* \* \* \* \*